(12) United States Patent
Kim et al.

(10) Patent No.: US 9,256,097 B2
(45) Date of Patent: Feb. 9, 2016

(54) DISPLAY APPARATUSES

(71) Applicant: Samsung Display Co., Ltd., Yongin, Gyeonggi-Do (KR)

(72) Inventors: Sungman Kim, Seoul (KR); Chul Kim, Hwaseong-si (KR); Hwa Yeul Oh, Seoul (KR); YoungJe Cho, Asan-si (KR); Hyunki Hwang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 147 days.

(21) Appl. No.: 14/134,369

(22) Filed: Dec. 19, 2013

(65) Prior Publication Data

US 2014/0313434 A1 Oct. 23, 2014

(30) Foreign Application Priority Data

Apr. 19, 2013 (KR) .......................... 10-2013-0043503

(51) Int. Cl.
| | |
|---|---|
| *G02F 1/1335* | (2006.01) |
| *G02F 1/1333* | (2006.01) |
| *G06F 3/041* | (2006.01) |
| *G06F 3/044* | (2006.01) |

(52) U.S. Cl.
CPC ............ *G02F 1/13338* (2013.01); *G06F 3/044* (2013.01); *G06F 3/0412* (2013.01); *G06F 2203/04111* (2013.01); *G06F 2203/04112* (2013.01)

(58) Field of Classification Search
CPC .................................................. G02F 1/13338
See application file for complete search history.

(56) References Cited

U.S. PATENT DOCUMENTS

| | | |
|---|---|---|
| 8,159,466 B2 | 4/2012 | Ma et al. |
| 8,259,078 B2 | 9/2012 | Hotelling et al. |
| 2008/0245582 A1 | 10/2008 | Bytheway |
| 2010/0013789 A1 | 1/2010 | Chung et al. |
| 2010/0110023 A1 | 5/2010 | Chien et al. |
| 2011/0242444 A1 | 10/2011 | Song |
| 2011/0279763 A1 | 11/2011 | Cho et al. |
| 2012/0105337 A1 | 5/2012 | Jun et al. |
| 2012/0218482 A1 | 8/2012 | Hwang et al. |
| 2012/0327020 A1 | 12/2012 | Kohara et al. |
| 2013/0194213 A1* | 8/2013 | Chou et al. ..................... 345/173 |
| 2014/0198268 A1 | 7/2014 | Sugita et al. |

(Continued)

FOREIGN PATENT DOCUMENTS

| | | |
|---|---|---|
| JP | 2005156291 | 6/2005 |
| JP | 2008-310551 | 12/2008 |

(Continued)

*Primary Examiner* — Timothy L Rude
(74) *Attorney, Agent, or Firm* — Innovation Counsel LLP

(57) ABSTRACT

A display apparatus includes a first substrate, a second substrate overlapping the first substrate, an image display part disposed between the first substrate and the second substrate, and a black matrix disposed on the second substrate. The display apparatus further includes a floating electrode overlapping the black matrix and being electrically floating. The display apparatus further includes first-type touch lines extending in a first direction, arranged along a second direction, electrically insulated from each other, and including a primary first-type touch line. The primary first-type touch line overlaps and is insulated from the floating electrode. The display apparatus further includes second-type touch lines extending in the second direction, arranged along the first direction, electrically insulated from each other, and including a primary second-type touch line. The primary second-type touch line overlaps and is insulated from the floating electrode.

20 Claims, 12 Drawing Sheets

(56) References Cited

U.S. PATENT DOCUMENTS

| | | | |
|---|---|---|---|
| 2015/0049260 A1* | 2/2015 | Yashiro et al. | 349/12 |
| 2015/0054803 A1* | 2/2015 | Yashiro et al. | 345/206 |
| 2015/0227237 A1* | 8/2015 | Ono et al. | 349/12 |
| 2015/0248183 A1* | 9/2015 | Schwartz et al. | 349/12 |

FOREIGN PATENT DOCUMENTS

| | | |
|---|---|---|
| JP | 2009-211531 | 9/2009 |
| JP | 2012-068287 | 4/2012 |
| JP | 2012-078483 | 4/2012 |
| JP | 2012-098687 | 5/2012 |
| JP | 2012-123771 | 6/2012 |
| KR | 10-2004-0001324 | 1/2004 |
| KR | 10-2008-0012594 | 2/2008 |
| KR | 10-2011-0020049 | 3/2011 |
| KR | 10-2011-0087758 | 8/2011 |
| KR | 10-2011-0100377 | 9/2011 |
| KR | 10-2011-0105136 | 9/2011 |
| KR | 10-2012-0067250 | 6/2012 |
| WO | 2013018592 | 2/2013 |

* cited by examiner

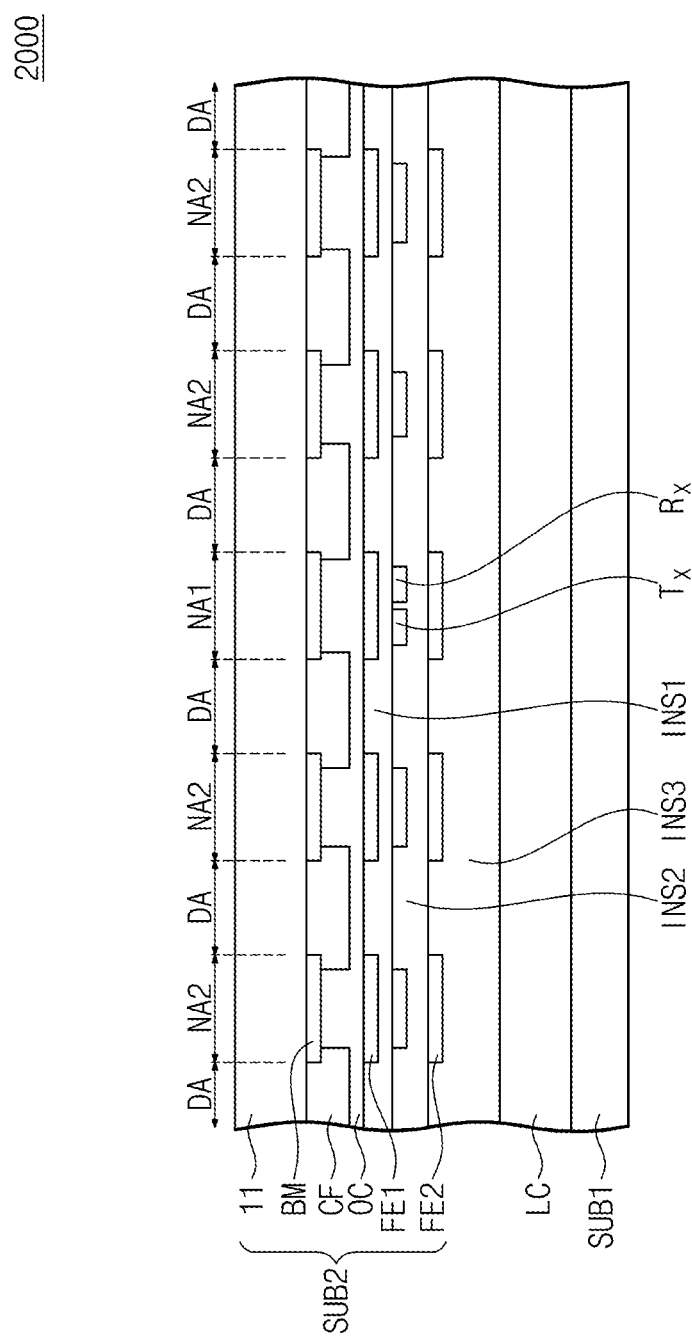

DISPLAY APPARATUSES

CROSS-REFERENCE TO RELATED APPLICATIONS

This U.S. non-provisional patent application claims priority under 35 U.S.C. §119 to and benefit of Korean Patent Application No. 10-2013-0043503, filed on Apr. 19, 2013, the entirety of which is incorporated by reference herein.

BACKGROUND

The present invention relates to display apparatuses. More particularly, the invention relates to display apparatuses capable of sensing an external input.

Generally, a touch panel may serve an interface between a user and a device that includes a display. The touch panel may receive a direct touch by a finger or a pen as an input. A user may touch the touch panel at a position corresponding to a button shown in a display to operate the device.

Typically, touch panels may be included in various devices, such as portable phones, personal digital assistances (PDAs), information boards, and medical devices.

Touch panels may include capacitive touch panels.

FIG. 5A is a cross-sectional view illustrating a conventional display apparatus 1001 that includes a capacitive touch panel. FIG. 5B is a circuit diagram illustrating equivalent capacitors of the conventional display apparatus 1001 when the conventional display apparatus 1001 is not touched. FIG. 5C is a circuit diagram illustrating equivalent capacitors of the conventional display apparatus 1001 when the conventional display apparatus 1001 is touched.

As illustrated in FIG. 5A, the conventional display apparatus 1001 may include a first substrate 1, a second substrate 2, and a liquid crystal layer 3. The second substrate 2 may include an insulating substrate 21, a black matrix 22, a color filter 23, a first insulating layer 24, a first-type touch line $R_{x1}$ (or first touch line $R_{x1}$), a second-type touch line $T_{x1}$ (or second touch line $T_{x1}$), and a second insulating layer 25. One of the substrates 1 and 2 may include a common electrode insulated from the touch lines $R_{x1}$ and $T_{x1}$. The common electrode may receive a common voltage $V_{com}$.

Only one of the touch lines $R_{x1}$ and $T_{x1}$ is disposed in a non-display region NA between two pixel regions DA that immediately neighbor each other in the conventional display apparatus 1001.

As illustrated in FIG. 5B, a first common capacitor $C_R$ is formed between the first touch line $R_{x1}$ and the common electrode, which is applied with the common voltage $V_{com}$. A second common capacitor $C_T$ is formed between the second touch line $T_{x1}$ and the common electrode, which is applied with the common voltage $V_{com}$. Additionally, an overlapping capacitor $C_C$, an inner capacitor $C_I$, and an outer capacitor $C_M$ are formed between the first touch line $R_{x1}$ and the second touch line $T_{x1}$. The overlapping capacitor $C_C$ is formed in a crossing region where the first and second touch lines $R_{x1}$ and $T_{x1}$ cross each other in a plan view of the conventional display apparatus 1001. The inner capacitor $C_I$ is formed within the second substrate 2 by a first touch line $R_{x1}$ and a second touch line $T_{x1}$ that immediately neighbor each other. The outer capacitor $C_M$ is formed outside the second substrate 2 by the first touch line $R_{x1}$ and the second touch line $T_{x1}$ that immediately neighbor each other. As a width of each of the insulating substrate 21, the black matrix 22, the color filter 23, and the first insulating layer 24 increases, a capacitance of the inner capacitor $C_I$ increases, but a capacitance of the outer capacitor $C_M$ decreases.

As illustrated in FIG. 5C, a position touched by a user be equivalent to a ground. Since the overlapping capacitor $C_C$ and the inner capacitor $C_I$ are formed within the display apparatus 1001, they are not influenced by the touch of the user. On the other hand, the outer capacitor $C_M$ is influenced by the touch of the user.

When the user touches the display apparatus 1001, the outer capacitor $C_M$ is divided into a first outer capacitor $C_{M1}$ and a second outer capacitor $C_{M2}$. The first outer capacitor $C_{M1}$ is formed between the first touch line $R_{x1}$ and the ground, and the second outer capacitor $C_{M2}$ is formed between the second touch line $T_{x1}$ and the ground.

The display apparatus 1001 may sense a variation between an equivalent capacitance before the touch and an equivalent capacitance after the touch to confirm whether the display apparatus 1001 is touched or not and to determine coordinates of a touch position.

SUMMARY

Embodiments of the invention may be related to display apparatuses with satisfactory touch-sensing sensitivity.

Some embodiments may be related to a display apparatus that includes a first (insulating) substrate, a second (insulating) substrate overlapping the first substrate, an image display part disposed between the first substrate and the second substrate, and a black matrix disposed on the second substrate. The image display part may be a liquid crystal layer. The display apparatus may further include a primary first-type floating electrode that overlaps a first portion of the black matrix and is electrically floating. The display apparatus may further include a plurality of first-type touch lines that extends in a first direction, the first-type touch lines being arranged along a second direction and being electrically insulated from each other, the first-type touch lines including a primary first-type touch line, the primary first-type touch line overlapping the primary first-type floating electrode and being electrically insulated from the primary first-type floating electrode. The display apparatus may further include a plurality of second-type touch lines that extends in the second direction, the second-type touch lines being arranged along the first direction and being electrically insulated from each other, the second-type touch lines including a primary second-type touch line, the primary second-type touch line overlapping the primary first-type floating electrode and being electrically insulated from the primary first-type floating electrode. The display apparatus may further include a common electrode that overlaps the plurality of first-type touch lines, overlaps the plurality of second-type touch lines, and is configured to receive a common voltage.

In some embodiments, the display apparatus may include a secondary first-type floating electrode overlapping a second portion of the black matrix, being electrically floating, and being disposed at a same layer as (and made of a same material as) the primary first-type floating electrode, wherein the plurality of first-type touch lines includes a secondary first-type touch line, and wherein the secondary first-type floating electrode overlaps the secondary first-type touch line without overlapping any second-type touch lines in a third direction that is perpendicular to each of the first direction and the second direction.

In some embodiments, the primary first-type touch line is narrower than the secondary first-type touch line in the first direction.

In some embodiments, the primary second-type touch line is narrower than the secondary first-type touch line in the first direction.

In some embodiments, the primary first-type touch line includes a primary first-type touch electrode and a secondary first-type touch electrode that are electrically connected to each other in the first direction, and the primary first-type touch electrode has a mesh structure and has a substantially rhombus shape.

In some embodiments, the primary first-type touch electrode overlaps four first-type floating electrodes that include the primary first-type floating electrode.

In some embodiments, the display apparatus may include a crossing insulating layer disposed between the primary first-type touch line and the primary second-type touch line at a position where the primary first-type touch line overlaps the primary second-type touch line.

In some embodiments, if a user touches the second substrate, then a first user capacitor, a second user capacitor, and a third user capacitor are formed, the first user capacitor being formed between the primary first-type touch line and the user, a second user capacitor being formed between the primary second-type touch line and the user, and the third user capacitor being formed between the primary first-type floating electrode and the user.

In some embodiments, the display apparatus may include the following elements: a planarization layer disposed between the black matrix and the primary first-type floating electrode; a first insulating layer disposed between the primary first-type floating electrode and the primary first-type touch line and disposed between the primary first-type floating electrode and the primary second-type touch line; and a second insulating layer disposed between the image display part and the primary first-type touch line and disposed between the image display part and the primary second-type touch line.

In some embodiments, the display apparatus may include a primary second-type floating electrode overlapping each of the primary first-type touch line and primary second-type touch line, being electrically insulated from each of the primary first-type touch line and primary second-type touch line by the second insulating layer, overlapping the first portion of the black matrix, and being electrically floating.

In some embodiments, the primary second-type floating electrode has a same shape as the primary first-type floating electrode in a plan view of the display apparatus.

In some embodiments, the display apparatus may include a secondary second-type floating electrode overlapping a second portion of the black matrix, being electrically floating, and being disposed at a same layer as (and made of a same material as) the primary second-type floating electrode, wherein the plurality of first-type touch lines includes a secondary first-type touch line, and wherein the secondary second-type floating electrode overlaps the secondary first-type touch line without overlapping any second-type touch lines in a third direction that is perpendicular to each of the first direction and the second direction.

In some embodiments, the display apparatus may include a secondary first-type floating electrode overlapping the secondary second-type floating electrode, being disposed on the planarization layer at a same layer as the primary first-type floating electrode, and being electrically floating, wherein the secondary first-type floating electrode overlaps the secondary first-type touch line without overlapping any second-type touch lines in the third direction, and wherein the secondary first-type touch line is disposed between the secondary first-type floating electrode and the secondary second-type floating electrode.

In some embodiments, the display apparatus may include a first feeding electrode electrically connected to each of the secondary first-type floating electrode and the secondary second-type floating electrode, the first feeding electrode being disposed through each of the first insulating layer and the second insulating layer.

In some embodiments, the display apparatus may include a second feeding electrode electrically connected to each of the primary first-type floating electrode and the primary second-type floating electrode, the second feeding electrode being disposed through each of the first insulating layer and the second insulating layer.

In some embodiments, the first feeding electrode overlaps the second portion of the black matrix.

In some embodiments, the display apparatus may include a feeding electrode electrically connected to each of the primary first-type floating electrode and the primary second-type floating electrode, the feeding electrode being disposed through each of the first insulating layer and the second insulating layer.

In some embodiments, the display apparatus may include a via-hole disposed through each of the first insulating layer and the second insulating layer, wherein the feeding electrode is disposed in the via-hole.

In some embodiments, the feeding electrode overlaps the first portion of the black matrix.

Some embodiments of the invention may be related to a display apparatus that includes a first substrate, a second substrate, and an image display part. The first substrate includes a plurality of pixel regions and a non-display region surrounding the pixel regions. The second substrate overlaps the first substrate. The image display part is disposed between the first substrate and the second substrate.

In some embodiments, the second substrate includes an insulating substrate, a black matrix, a floating electrode set, a first touch line, and a second touch line.

In some embodiments, the black matrix is disposed on the insulating substrate and overlaps the non-display region of the first substrate.

In some embodiments, the floating electrode set overlaps the black matrix and is covered by the black matrix in a plan view of the display apparatus. The floating electrode set may include a plurality of floating electrodes, and each of the floating electrodes may overlap with the first touch line and/or the second touch line. The plurality of floating electrodes includes a first floating electrode.

In some embodiments, the first touch line overlaps the first floating electrode and is insulated from the first floating electrode. The first touch line is covered by the black matrix in a plan view of the display apparatus. The second touch line overlaps the first floating electrode and is insulated from the first floating electrode and the first touch line. The second touch line is covered by the black matrix in a plan view of the display apparatus.

In some embodiments, the first touch line may include first-type touch electrodes connected to each other in the first direction, and each of the first-type touch electrodes may have a mesh structure within a rhombus-shaped border. The second touch line may include second-type touch electrodes connected to each other in the second direction, and each of the second touch electrodes may have a mesh structure within a rhombus-shaped border In some embodiments, each of the touch electrodes may overlap four floating electrodes of the floating electrode set.

BRIEF DESCRIPTION OF THE DRAWINGS

The invention will become more apparent in view of the attached drawings and accompanying detailed description.

FIG. 7 is a cross-sectional view illustrating a display apparatus according to some embodiments of the invention;

DETAILED DESCRIPTION OF THE EMBODIMENTS

The invention will now be described more fully hereinafter with reference to the accompanying drawings, in which some embodiments of the invention are shown. The advantages and features of the invention and methods of achieving them will be apparent from the following embodiments described in more detail with reference to the accompanying drawings. It should be noted that the invention is not limited to the embodiments, but may be implemented in various forms. The terminology used herein is for the purpose of describing particular embodiments and is not intended to limit the invention. As used herein, the singular terms "a," "an" and "the" may be intended to include the plural forms as well, unless the context clearly indicates otherwise. As used herein, the term "and/or" may include any and all combinations of one or more of the associated items. Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively. In the description, for conciseness, "connected" may mean "electrically connected"; "insulated" may mean "electrically insulated".

Figure 1:
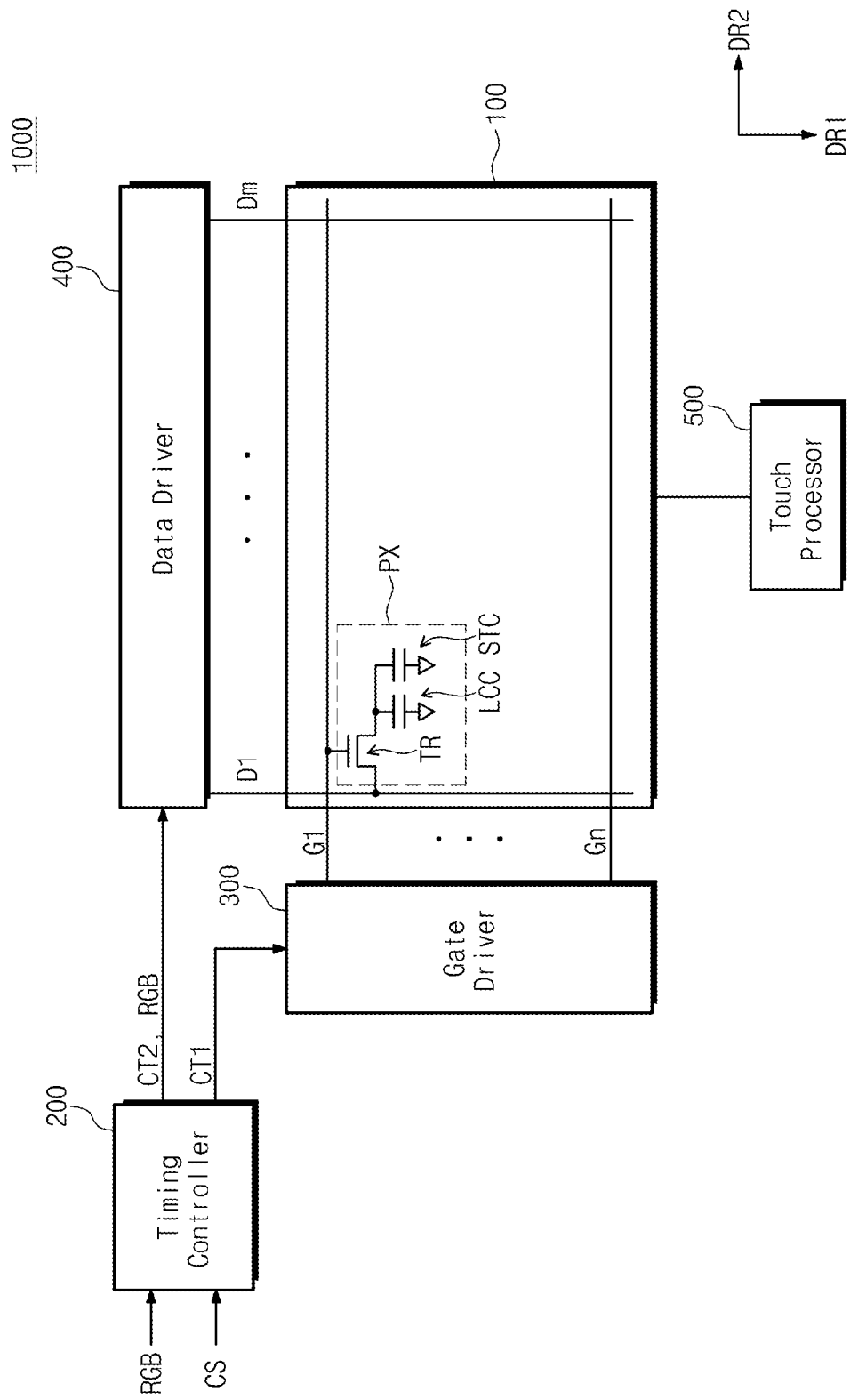
FIG. 1 is a schematic block diagram illustrating a display apparatus according to some embodiments of the invention.

FIG. 1 is a schematic block diagram illustrating a display apparatus 1000 according to some embodiments of the invention.

Referring to FIG. 1, the display apparatus 1000 includes a display panel 100, a timing controller 200, a gate driver 300, a data driver 400, and a touch processor 500.

The display panel 100 may display an image. A user may touch a surface (e.g., a top surface or a front surface) of the display panel 100.

For example, the display panel 100 may be a liquid crystal display panel, an organic light emitting display panel, an electrophoretic display panel, or an electrowetting display panel, through the invention is not limited thereto. Hereinafter, a liquid crystal display panel will be described as an example.

The display apparatus 1000 may further include a backlight assembly (not shown) for providing light to the display panel 100. The display panel 100 may be operated in one or more of a vertical alignment (VA) mode, a patterned vertical alignment (PVA) mode, an in-plane switching (IPS) mode, a fringe-field switching (FFS) mode, and a plane to line switching (PLS) mode, though the invention is not limited thereto.

Figure 2:
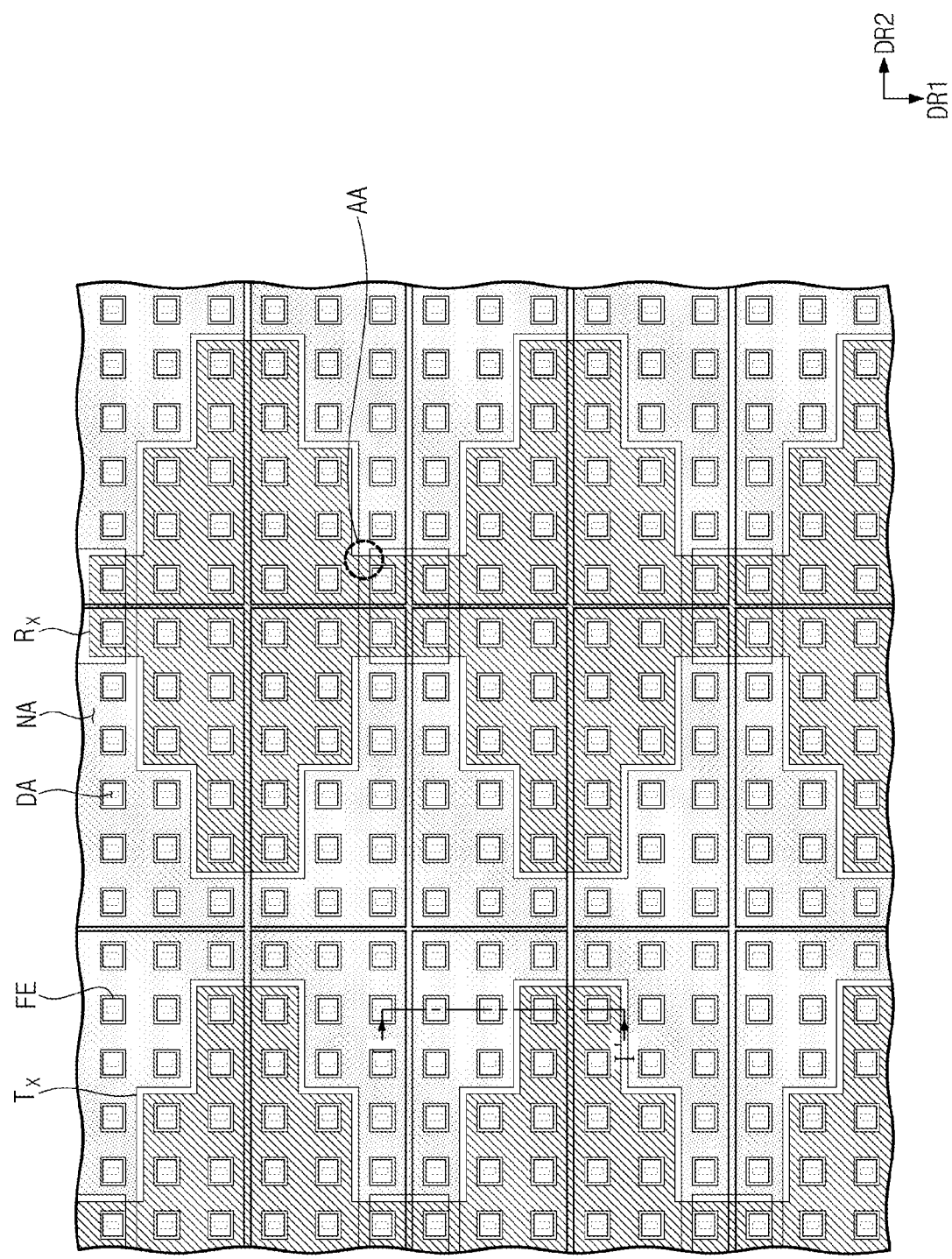
FIG. 2 is a plan view of a display panel of FIG. 1.

The display panel 100 includes a plurality of gate lines G1 to Gn receiving gate signals and includes a plurality of data lines D1 to Dm for receiving data voltages. The gate lines G1 to Gn are insulated from the data lines D1 to Dm. The gate lines G1 to Gn, which extend in a first direction DR1, cross the data lines D1 to Dm, which extend in a second direction DR2 that may be substantially perpendicular to the first direction DR1. As illustrated in FIG. 2, a plan view of the display panel 100, a plurality of pixel regions DA and a non-display region NA are defined in the display panel 100. The pixel regions DA are arranged in a matrix form, and the non-display region NA surrounds the pixel regions. A pixel PX is disposed in each pixel region DA. An example equivalent circuit of a pixel PX is illustrated in FIG. 1. The pixel PX includes a thin film transistor TR, a liquid crystal capacitor LCC, and a storage capacitor STC.

Although not shown in the drawings, the thin film transistor TR may include a gate electrode, a source electrode, and a drain electrode. The gate electrode may be connected to a first gate line G1 of the gate lines G1 to Gn. The source electrode may be connected to a first data line D1 of the data lines D1 to Dm. The drain electrode may be connected to the liquid crystal capacitor LCC and the storage capacitor STC. The liquid capacitor LCC and the storage capacitor STC are connected in parallel to the drain electrode.

Figure 3:
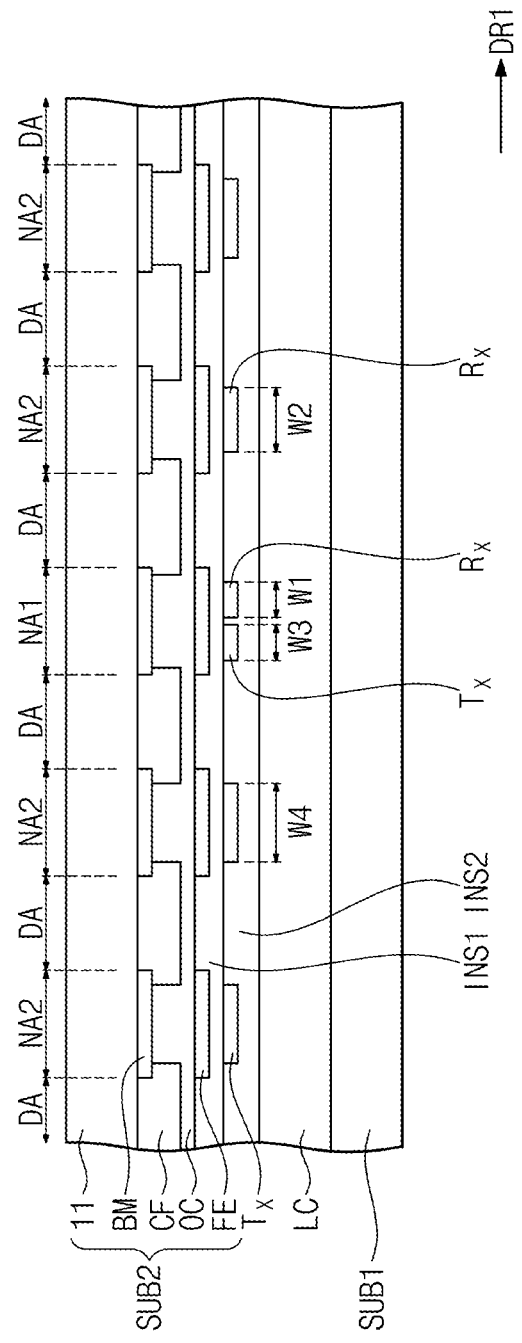
FIG. 3 is a cross-sectional view taken along a line I-I' indicated in FIG. 2.

As illustrated in FIG. 3, a cross-sectional view of the display panel 100, the display panel 100 may include a first substrate SUB1, a second substrate SUB2 overlapping the first substrate SUB1, and an image display part (e.g., a liquid crystal layer LC) disposed between the first substrate SUB1 and the second substrate SUB2.

The gate lines G1 to Gn, the data lines D1 to Dm, and the thin film transistor TR, and a first electrode (not shown) of the liquid crystal capacitor LCC may be formed on the first substrate SUB1. The thin film transistor may apply a data voltage to the first electrode in response to a gate signal.

A second electrode (not shown) of the liquid crystal capacitor LCC may be formed on the second substrate SUB2, and a reference voltage may be applied to the second electrode. A color filter CF and a black matrix BM may also be included in the second substrate SUB2.

The liquid crystal layer functions as a dielectric between the first electrode and the second electrode. A voltage corresponding to a voltage difference between the data voltage and the reference voltage is charged in the liquid crystal capacitor LCC.

The timing controller 200 may receive an image signal RGB and a control signal CS from an external graphic controller (not shown).

The timing controller 200 may receive the control signal CS (e.g., a vertical synchronization signal, a horizontal synchronization signal, a main clock, and/or a data enable signal) to output a first control signal CT1 and a second control signal CT2.

The first control signal CT1 is a gate control signal for controlling operation of the gate driver 300. The first control signal CT1 may include a gate clock and a vertical start signal. The second control signal CT2 is a data control signal for controlling operation of the data driver 400. The second control signal CT2 include a vertical start signal for starting the operation of the data driver 400, a reverse signal for reversing a polarity of at least a data voltage, and an output indicating signal for determining an output time of the data voltage.

The gate driver 300 is electrically connected to the gate lines G1 to Gm of the display panel 100 to provide the gate signals to the gate lines G1 to Gm. In more detail, the gate driver 300 may generate the gate signals based on the first control signal CT1 and may then sequentially output the generated gate signals to the gate lines G1 to Gn.

The data driver 400 may generate data voltages based on the image signal RGB and the second control signal CT2 and may provide the data voltages to the data lines D1 to Dm.

The touch processor 500 may sense a capacitance variation of a capacitor formed on the display panel 100 to detect coordinates of a touch position.

FIG. 2 is a plan view of the display panel 100 of FIG. 1, and FIG. 3 is a cross-sectional view taken along a line I-I' indicated in FIG. 2.

Referring to FIGS. 2 and 3, the display panel 100 may include a first substrate SUB1, a second substrate SUB2, and a liquid crystal layer LC. The liquid crystal layer LC is disposed between the first substrate SUB1 and the second substrate SUB2 to control a transmittance of incident light.

The second substrate SUB2 includes an insulating substrate 11, a black matrix BM, a color filter CF, a planarization layer OC, a floating electrode FE, a first insulating layer INS1, a plurality of first-type touch lines $R_x$ (or first touch lines $R_x$, for conciseness), a plurality of second-type touch lines $T_x$ (or second touch lines $T_x$, for conciseness), and a second insulating layer INS2.

The non-display region NA includes a boundary non-display region NA1 and an inner non-display region NA2. The boundary non-display region NA1 is defined as a portion of the non-display region NA where an edge of a first touch line $R_x$ coexists with an edge of a second touch line $T_x$ between two immediately neighboring pixel regions DA in a plan view of the display panel 100, as can be appreciated from FIG. 2 and FIG. 3. A boundary between the first touch line $R_x$ and the second touch line $T_x$ exists in the boundary non-display region NA1. The inner non-display region NA2 is defined as an inner non-display region surrounded by the boundary non-display region NA1.

The insulating substrate 11 may be a transparent insulating substrate, such as a glass substrate or a plastic substrate.

The black matrix BM is disposed on the insulating substrate 11 to absorb incident light. The black matrix BM overlaps the non-display region NA but does not overlap the pixel region DA in a display direction of the display panel 100 (which is substantially perpendicular to both the first direction DR1 and the second direction DR2).

The color filter CF may partially overlap the black matrix BM. The color filter CF may filter the incident light for displaying a particular color. The color filter CF may be configured for displaying at least one of a red color, a green color, a blue color, and a white color.

The planarization layer OC is disposed on the color filter CF and the black matrix BM. The planarization layer OC is formed of an insulating material. The planarization layer OC may planarize an uneven surface of the combination of the color filter CF and the black matrix BM.

The floating electrode FE is disposed on the planarization layer OC. The floating electrode FE is disposed in the non-display region NA and overlaps the black matrix BM. In particular, the floating electrode FE may be disposed in at least the boundary non-display region NA1.

The floating electrode FE is insulated from each of the touch lines $R_x$ and $T_x$ to form capacitors. The floating electrode FE is not applied with a voltage and is floating.

A plurality of floating electrodes EF may be spaced apart (and/or insulated) from each other.

FIG. 2 illustrates that each floating electrode FE may have a mesh structure that has a substantially quadrilateral shape and surrounds 18 pixel regions DA (e.g., 6×3 pixel regions DA) in a plan view of the display panel 100. A floating electrode FE may overlap a portion of a first touch line $R_x$ and a portion of a second touch line $T_x$. In an embodiment, each of the portion of the first touch line $R_x$ and the portion of the second touch line $T_x$ may correspond to 9 pixel regions DA (e.g., 1 pixel region DA, 3 pixel regions DA, and 5 pixel regions DA in 3 rows). FIG. 2 illustrates that four floating electrodes FE overlaps an intersection (or overlapping portions) of a first touch line $R_x$ and a second touch line $T_x$. A floating electrode FE may have one of various shapes other than the substantially quadrilateral shape illustrated in FIG. 2. In an embodiment, a floating electrode FE overlaps the boundary non-display region NA1 and has a shape that is not limited to a quadrilateral shape.

As illustrated in FIG. 3, the first insulating layer INS1 is disposed on the floating electrodes FE. The first insulating layer INS1 is formed of a transparent insulating material, so as to insulate the floating electrodes FE from other elements.

As illustrated in FIG. 3, one or more first touch lines $R_x$ may be disposed on the first insulating layer INS1 and may be disposed in the non-display region NA. As illustrated in FIG. 2, a first touch line $R_x$ may extend in the first direction DR1. A plurality of first touch lines $R_x$ may be provided in the display panel 100. The plurality of first touch lines $R_x$ may be spaced apart from (and/or insulated from) each other in the second direction DR2. Each of the first touch lines $R_x$ may include a plurality of first-type touch electrodes (or first touch electrodes, for conciseness). Each of the first touch electrodes may have a mesh structure that has a substantially rhombus shape and surrounds 36 pixel regions DA (e.g., 2 pixel regions, 6 pixel regions, 10 pixel regions, 10 pixel regions, 6 pixel regions, and 2 pixel regions in 6 rows) in a plan view of the display panel 100. The first touch electrodes of a first touch line $R_x$ are connected to each other in the first direction DR1. Each of the first touch electrodes may overlap four floating electrodes FE. In one or more embodiments, the first touch electrodes may have one or more of various shapes and may overlap one or more of various numbers of floating electrodes FE. In one or more embodiments, one end of each first touch line $R_x$ may be connected to a first-type signal supplying part, or first signal supplying part (not shown), and another end of the first touch line $R_x$ may be connected to a first-type signal receiving part, or first signal receiving part (not shown). The first signal supplying part may supply a first-type voltage signal (or first voltage signal) to the first touch line $R_x$. The first signal receiving part may determine a touch coordinate in the second direction DR2 based on a variation of the first voltage signal.

One or more second touch lines $T_x$ may be disposed on the first insulating layer INS1 and may be disposed in the non-display region NA. Each second touch line $T_x$ is spaced from and is insulated from each first touch line $R_x$. A second touch line $T_x$ may extend in the second direction DR2. A plurality of second touch lines $T_x$ may be provided in the display panel 100. The plurality of second touch line $T_x$ may be spaced apart from (and/or insulated from) each other in the first direction DR1. Each of the second touch lines $T_x$ may include a plurality of second-type touch electrodes (or second touch electrodes). Each of the second touch electrodes may have a mesh structure disposed that has a substantially rhombus shape and surrounds 36 pixel regions DA (e.g., 2 pixel regions, 6 pixel regions, 10 pixel regions, 10 pixel regions, 6 pixel regions, and 2 pixel regions in 6 rows) in a plan view of the display panel 100. The second touch electrodes of a second touch line $T_x$ are connected to each other in the second direction DR2. Each of the second touch electrodes may overlap four floating electrodes FE. In one or more embodiments, the second touch electrodes may have one or more of various shapes and may overlap one or more of various numbers of floating electrodes FE. In one or more embodiments, one end of each second touch line $T_x$ may be connected to a second-type signal supplying part, or second signal supplying part (not shown), and another end of the second touch line $T_x$ may be connected to a second-type signal receiving part, or second signal receiving part (not shown). The second signal supplying part may supply a second-type voltage signal (or second voltage signal) to the second touch line $T_x$. The second signal receiving part may determine a touch coordinate in the first direction DR1 based on a variation of the second voltage signal.

The boundary non-display region NA1 between two pixel regions DA immediately neighboring each other in the first direction DR1 is illustrated in FIG. 3. Both a portion of the first touch lines $R_x$ and a portion of the second touch lines $T_x$ are disposed in the boundary non-display region NA1. A width (in the first direction DR1) of the boundary non-display region NA1 is greater than a sum of a width (in the first direction DR1) of the portion of a first touch line disposed in the boundary non-display region NA1 and a width (in the first direction DR1) of the portion of a second touch line disposed in boundary non-display region NA1.

Other portions of the first touch lines $R_x$ and the second touch lines $T_x$ may be separately disposed in the inner non-display region NA2.

An edge of a first touch line $R_x$ and an edge of a second touch line $T_x$ are disposed in the boundary non-display region NA1 and are spaced apart from each other.

The width W1 of a portion of a first touch line $R_x$ disposed in the boundary non-display region NA1 may be equal to or less than a width W2 of a portion of the first touch line $R_x$ disposed in the inner non-display region NA2. In one more embodiments, the width W1 is less than the width W2 (W1<W2), as illustrated in FIGS. 2 and 3.

The width W3 of a portion of a second touch line $T_x$ disposed in the boundary non-display region NA1 may be equal to or less than a width W4 of a portion of the second touch line $T_x$ disposed in the inner non-display region NA2. In one or more embodiments, the width W3 is less than the width W4 (W3<W4), as illustrated in FIGS. 2 and 3.

A portion of the boundary non-display region NA1 between two adjacent pixel regions DA that immediately neighbor each other in the first direction DR1 has been described as an example with reference to FIGS. 2 and 3. A portion of the boundary non-display region NA1 between adjacent pixel regions that immediately neighbor each other in the second direction DR2 may have analogous configurations, with both a portion of a first touch line $R_x$ and a portion of a second touch line $T_x$ disposed therein.

The second insulating layer INS2 is disposed on the first touch lines $R_x$ and the second touch lines $T_x$. The second insulating layer INS2 covers the touch lines $R_x$ and $T_x$, so as to insulate the touch lines $R_x$ and $T_x$ from one another.

Figure 4:
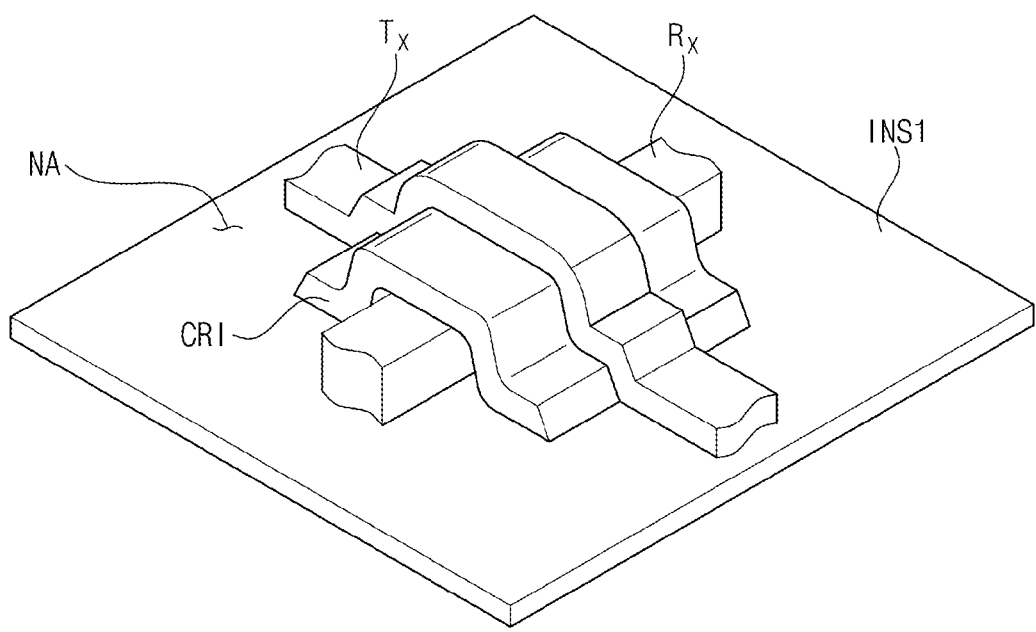
FIG. 4 is an enlarged perspective view of a portion 'AA' indicated in FIG. 2.

FIG. 4 is an enlarged perspective view of a portion 'AA' indicated in FIG. 2.

A structure of a crossing region of a first line $R_x$ and a second touch line $T_x$ are described with reference to FIGS. 2 and 4.

Referring to FIGS. 2 and 4, the second substrate SUB2 further includes a crossing insulating layer CRI. The crossing insulating layer CRI is disposed between the first touch line $R_x$ and the second touch line $T_x$ in the crossing region of the touch lines $R_x$ and $T_x$. The crossing insulating layer CRI is disposed in the non-display region NA. The first touch line Rx and the second touch line $T_x$ cross each other and are insulated from each other by the crossing insulating layer CRI therebetween.

In one or more embodiments the first touch line $R_x$ and the second touch line $T_x$ are disposed at the same level (or layer) except the crossing region and are insulated from each other in a bridge form within the crossing region. In one or more embodiments, the first touch line $R_x$ may be disposed at a different level (or layer) from the second touch line $T_x$, and an insulating layer may be disposed between the first touch line $R_x$ and the second touch line $T_x$.

Figure 6A:
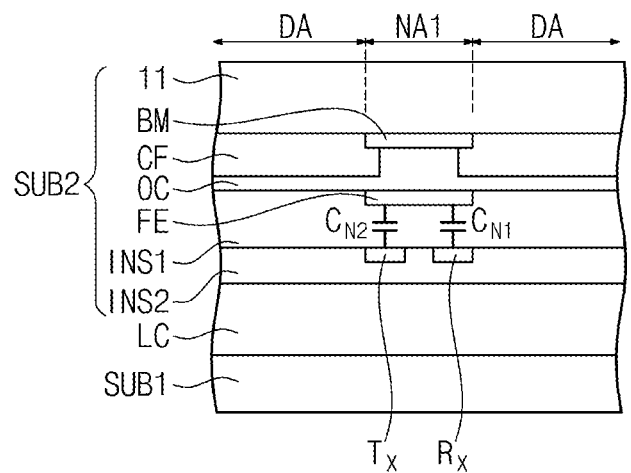
FIG. 6A is a cross-sectional view illustrating a display apparatus according to some embodiments of the invention.
Figure 6B:
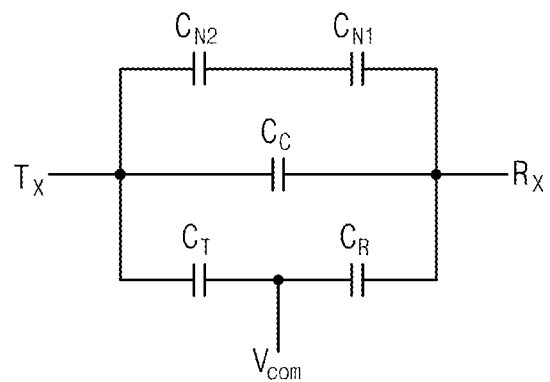
FIG. 6B is a circuit diagram illustrating equivalent capacitors of a display apparatus according to some embodiments of the invention when the display apparatus is not touched.
Figure 6C:
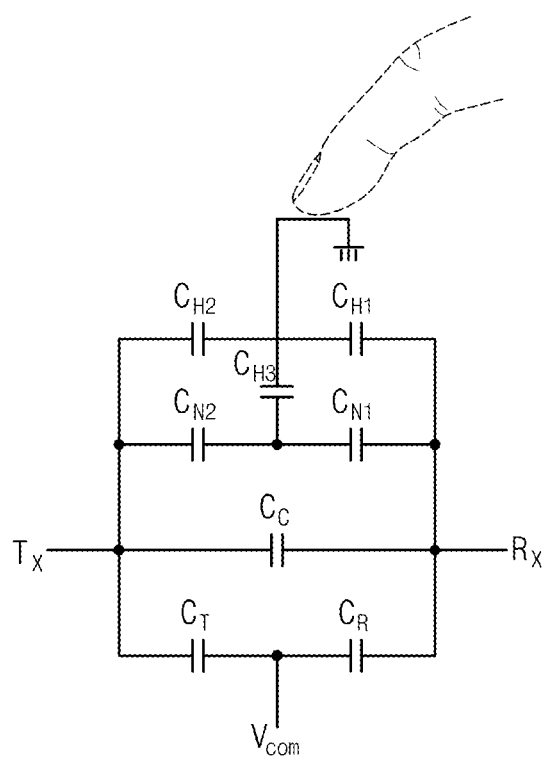
FIG. 6C is a circuit diagram illustrating equivalent capacitors of a display apparatus according to some embodiments of the invention when the display apparatus is touched.

FIG. 6A is a cross-sectional view illustrating the display apparatus 1000 according to some embodiments of the invention. FIG. 6B is a circuit diagram illustrating equivalent capacitors of the display apparatus 1000 according to some embodiments of the invention when the insulating substrate 11 is not touched. FIG. 6C is a circuit diagram illustrating equivalent capacitors of the display apparatus 1000 according to some embodiments of the invention when the insulating substrate 11 is touched. FIG. 6A illustrates the boundary non-display region NA1 and the surroundings of the boundary non-display region NA1 illustrated in FIG. 3. A portion of a first touch line $R_x$ and a portion of a second touch line $T_x$ are disposed in a same portion of the boundary non-display region NA1 that is positioned between two immediately neighboring pixel regions DA.

When the insulating substrate 11 is not touched, as illustrated in FIG. 6B, a first common capacitor $C_R$, a second common capacitor $C_T$, and an overlapping capacitor $C_C$ of the display apparatus 1000 are as analogous to those of the display apparatus 1001 described with reference with FIG. 5B.

A first floating capacitor $C_{N1}$ is formed between the first touch line $R_x$ and the floating electrode FE that overlaps the first touch line $R_x$. A second floating capacitor $C_{N2}$ is formed between the second touch line $T_x$ and the floating electrode FE. A distance between the first touch line $R_x$ and the floating electrode FE and/or a distance between the second touch line $T_x$ and the floating electrode FE may be substantially smaller than a distance between the first touch line $R_x$ and the second touch line $T_x$. Thus, a capacitor formed between the touch lines $R_x$ and $T_x$ has a capacitance that may be substantially smaller than one or more of the capacitances of the floating capacitors $C_{N1}$ and $C_{N2}$ and may be neglected, such that the capacitor is not illustrated in FIGS. 6A, 6B, and 6C.

As illustrated in FIGS. 6A and 6C, a position on the insulating substrate 11 touched by a user is equivalent to a ground. Since the first and second floating capacitors $C_{N1}$ and $C_{N2}$, the overlapping capacitor $C_C$, and the common capacitors $C_R$ and $C_T$ are formed within the display apparatus 1000, they are not influenced by the touch of the user.

When the user touches the insulating substrate 11 of the display apparatus 1000, a first user capacitor $C_{H1}$, a second user capacitor $C_{H2}$, and a third user capacitor $C_{H3}$ are formed. The first user capacitor $C_{H1}$ is formed between the first touch line $R_x$ and the ground. The second user capacitor $C_{H2}$ is formed between the second touch line $T_x$ and the ground. The third user capacitor $C_{H3}$ is formed between the floating electrode FE and the ground.

A capacitance of a combined capacitor formed by the user capacitors $C_{H1}$, $C_{H2}$, and $C_{H3}$ may represent the touch on the insulating substrate 11 of the display apparatus 1000. The touch processor 500 illustrated in FIG. 1 may sense the capacitance of the combined capacitor to determine that the insulating substrate 11 of the display apparatus 1000 has been touched and to determine coordinates of the touch position.

Figure 5A:
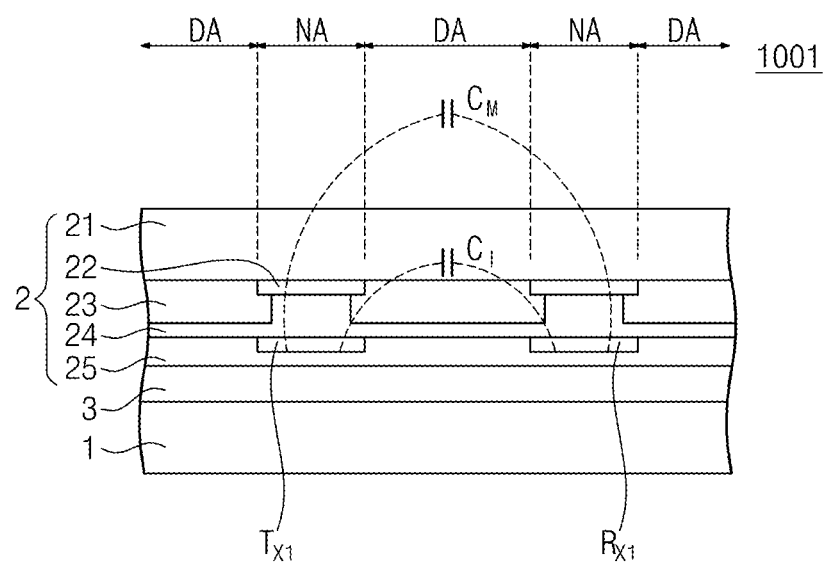
FIG. 5A is a cross-sectional view illustrating a conventional display apparatus.
Figure 5B:
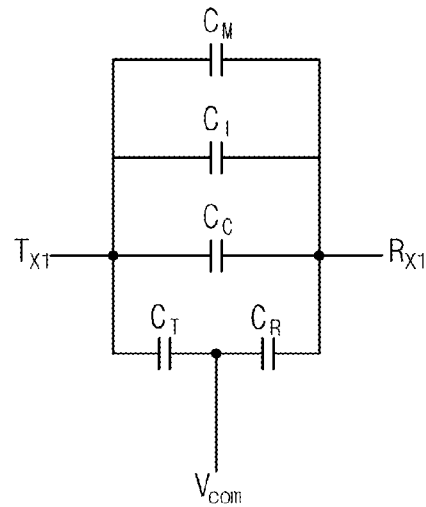
FIG. 5B is a circuit diagram illustrating equivalent capacitors of a conventional display apparatus when the conventional display apparatus is not touched.
Figure 5C:
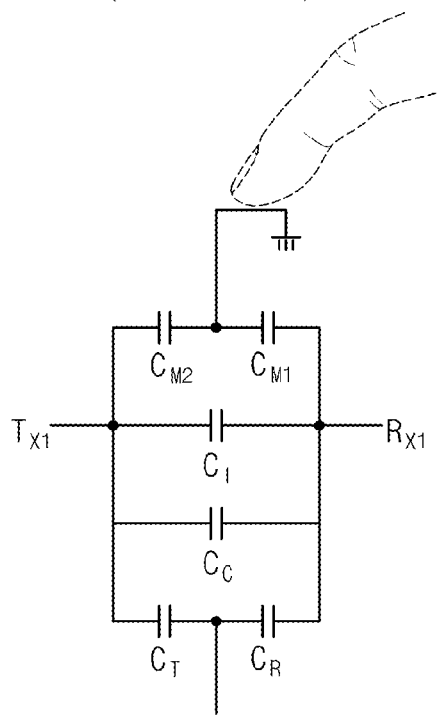
FIG. 5C is a circuit diagram illustrating equivalent capacitors of a conventional display apparatus when the conventional display apparatus is touched.

The inner capacitor $C_I$ and the outer capacitor $C_M$ illustrated in FIGS. 5A to 5C may be disregarded in the display apparatus 1000 according to some embodiments of the invention due to the floating electrode FE. If the insulating substrate 21 of the conventional display apparatus is touched, the outer capacitor $C_M$ disappears, and the outer capacitors $C_{M1}$ and $C_{M2}$ are generated. In contrast, capacitances of the floating capacitors $C_{N1}$ and $C_{N2}$ may not be substantially changed by a touch on the insulating substrate 11 in the display apparatus 1000 according to some embodiments of the invention. If the insulating substrate 11 of the display apparatus is touched, the user capacitors $C_{H1}$, $C_{H2}$, and $C_{H3}$ are generated. The combined capacitance of the $C_{H1}$, $C_{H2}$, and $C_{H3}$ of the display apparatus 1000 may be substantially more significant than the difference between the capacitance of the capacitor $C_M$ and the combined capacitance of the capacitors $C_{M1}$ and $C_{M2}$ of the display apparatus 1001. Advantageously, the display apparatus 1000 according to some embodiments of the invention may have substantially higher touch sensing sensitivity in comparison with the conventional display apparatus 1001.

FIG. 7 is a cross-sectional view illustrating a display apparatus 2000 according to some embodiments of the invention.

The display apparatus 2000 includes a first-type floating electrode FE1 (or first floating electrode FE1, for conciseness), a second-type floating electrode FE2 (or second floating electrode FE2, for conciseness), and a third insulating layer INS3, and some elements (and/or features) analogous to some elements (and/or features) of the display apparatus 1000 illustrated in FIGS. 1 to 4.

The first floating electrode FE1 may be substantially analogous to the floating electrode FE illustrated in FIG. 3.

The second floating electrode FE2 is disposed on the second insulating layer INS2. The second floating electrode FE2 may overlap the first floating electrode FE1 with the touch lines $R_x$ and $T_x$ being disposed therebetween. The second floating electrode FE2 is disposed in the non-display region NA (which includes regions NA1 and NA2). The second floating electrode FE2 may overlap at least the boundary non-display region NA1. The second floating electrode FE2 may have the same shape as the first floating electrode FE1 in a plan view of the display apparatus 2000.

The second floating electrode FE2 is insulated from the touch lines $R_x$ and $T_x$ to form capacitors along with the touch lines $R_x$ and $T_x$. The second floating electrode FE2 is not applied with a voltage, so as to be electrically floating.

The third insulating layer INS3 is disposed on the second floating electrode FE2. The third insulating layer INS3 is formed of a transparent insulating material. Thus, the third insulating layer INS3 insulates the second floating electrodes FE2 from other elements.

Figure 8A:
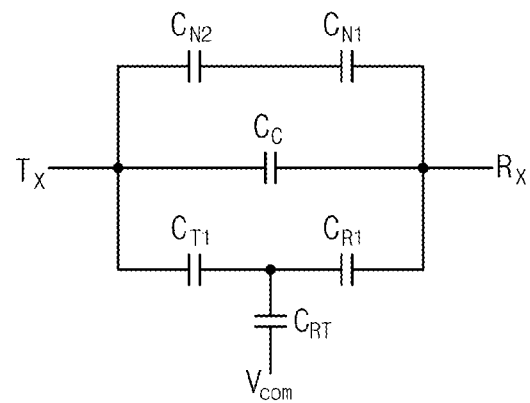
FIG. 8A is a circuit diagram illustrating equivalent capacitors of the display apparatus of FIG. 7 when the display apparatus is not touched.
Figure 8B:
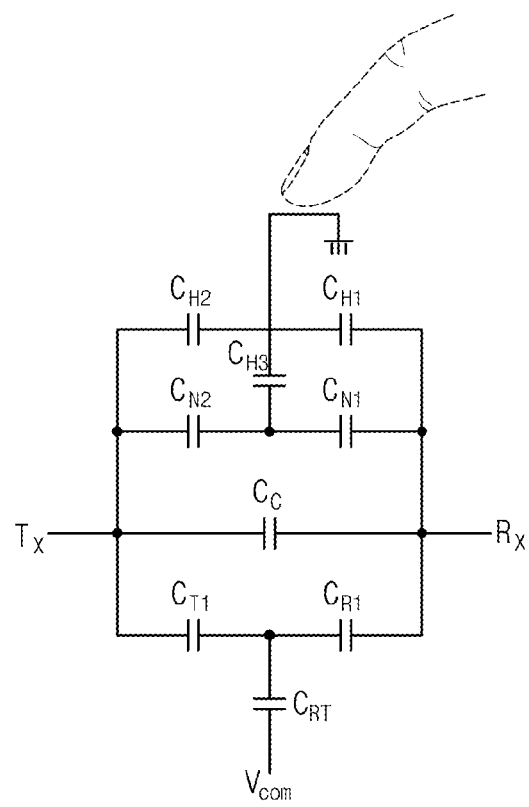
FIG. 8B is a circuit diagram illustrating equivalent capacitors of the display apparatus of FIG. 7 when the display apparatus is touched.

FIG. 8A is a circuit diagram illustrating equivalent capacitors of the display apparatus 2000 of FIG. 7 when the insulating substrate 11 of the display apparatus 2000 is not touched. FIG. 8B is a circuit diagram illustrating equivalent capacitors of the display apparatus 2000 of FIG. 7 when the insulating substrate 11 of the display apparatus 2000 is touched.

Referring to FIGS. 7, 8A, and 8B, equivalent capacitors of the display apparatus 2000 may further include a third common capacitor $C_{RT}$, in comparison with the equivalent capacitors the display apparatus 1000 illustrated in FIGS. 6B and 6C.

The third common capacitor $C_{RT}$ may be formed between the second floating electrode FE2 and a common electrode, which may be applied with a common voltage $V_{com}$.

In the display apparatus 2000, a first common capacitor $C_{R1}$ may be formed between the first touch line $R_x$ and the second floating electrode FE2, and a second common capacitor $C_{T1}$ may be formed between the second touch line $T_x$ and the second floating electrode FE2.

In the display apparatus 2000, a capacitance of a combined capacitor formed by the user capacitors $C_{H1}$, $C_{H2}$, and $C_{H3}$ may represent a touch on the insulating layer 11 of the display apparatus 2000. The display apparatus 2000 may sense the capacitance of the combined capacitor to determine that insulating substrate 11 of the display apparatus 2000 has been touched and to determine coordinates of the touch position.

Figure 9:
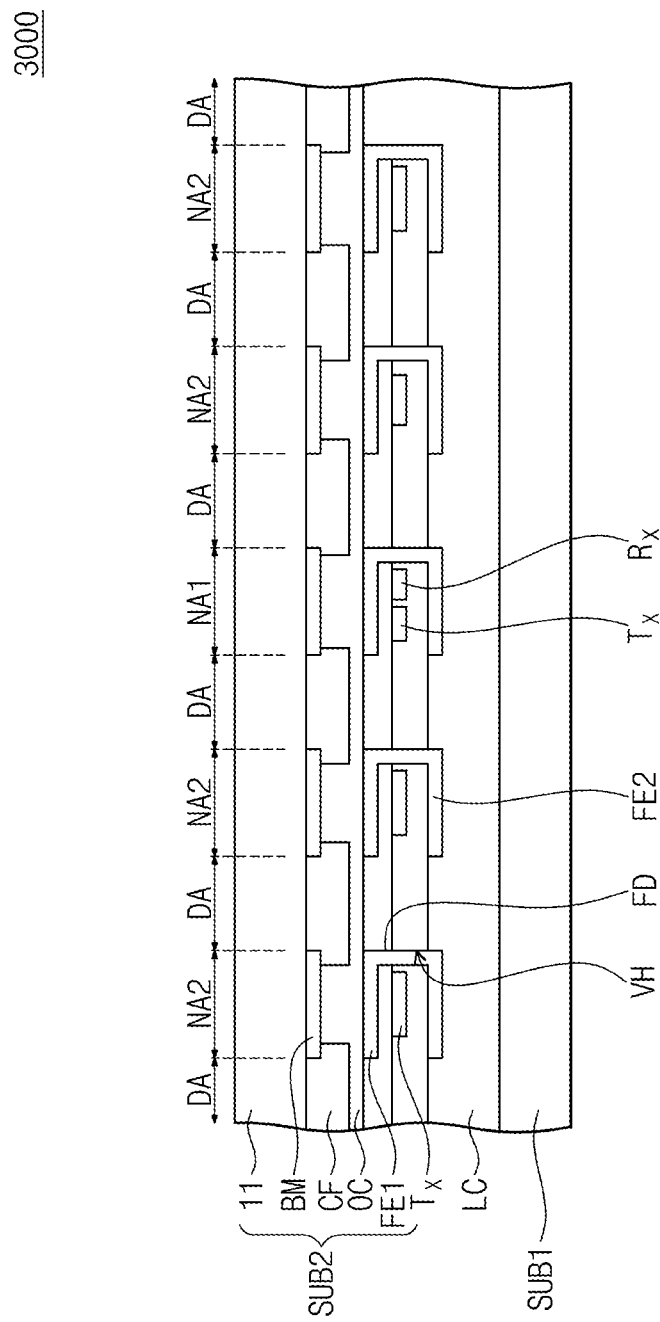
FIG. 9 is a cross-sectional view illustrating a display apparatus according to some embodiments of the invention.

FIG. 9 is a cross-sectional view illustrating a display apparatus 3000 according to some embodiments of the invention.

The display apparatus 3000 may include a first-type floating electrode FE1 (or first floating electrode FE1, for conciseness) and second-type floating electrode FE2 (or a second floating electrode FE2, for conciseness) that are electrically connected to each other. Some elements of the display apparatus 3000 may be substantially analogous to some elements of the display apparatus 2000 of FIG. 7 and/or some elements of the display apparatus 1000 of FIG. 6A. Referring to FIG. 9, the display apparatus 3000 may further include a feeding electrode FD.

The feeding electrode FD may be disposed through the insulating layers INS1 and INS2 to electrically connect the first floating electrode FE1 to the second floating electrode FE2. A via-hole VH may be formed through the insulating layers INS1 and INS2, and then the feeding electrode FD may be formed in the via-hole VH.

The feeding electrode FD may be disposed in the non-display region NA. The feeding electrode FD is not applied with a voltage, so as to be electrically floating.

The feeding electrode FD, the first floating electrode FE1, and the second floating electrode FE2 may be formed as an integral electrode and formed of a same material. The integral electrode may have a hollow, and the touch lines $R_x$ and $T_x$ may be disposed inside the hollow.

Figure 10A:
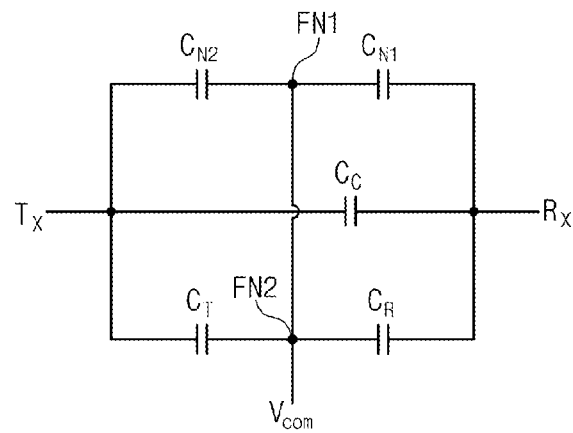
FIG. 10A is a circuit diagram illustrating equivalent capacitors of the display apparatus of FIG. 9 when the display apparatus is not touched.
Figure 10B:
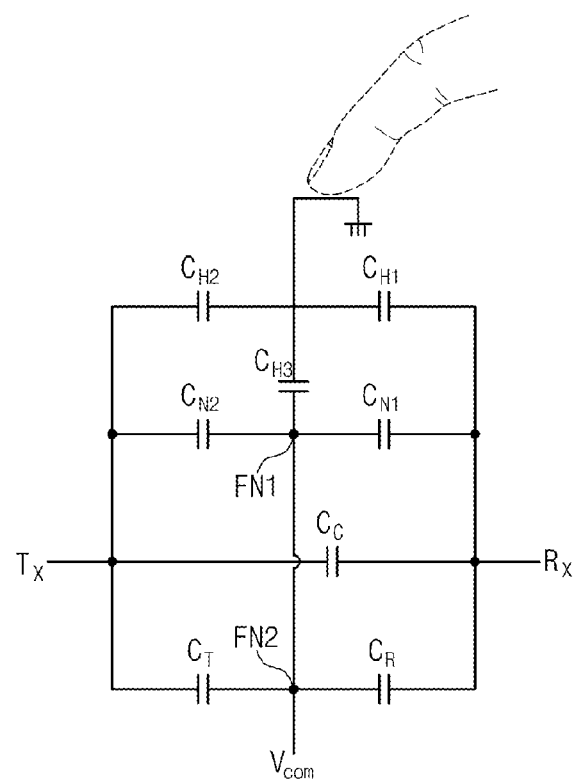
FIG. 10B is a circuit diagram illustrating equivalent capacitors of the display apparatus of FIG. 9 when the display apparatus is touched.

FIG. 10A is a circuit diagram illustrating equivalent capacitors of the display apparatus 3000 of FIG. 9 when the insulating substrate 11 of the display apparatus 3000 is not touched. FIG. 10B is a circuit diagram illustrating equivalent capacitors of the display apparatus 3000 of FIG. 9 when the insulating substrate 11 of the display apparatus 3000 is touched.

Referring to FIGS. 9, 10A, and 10B, an equivalent circuit that includes equivalent capacitors of the display apparatus 3000 may include a first floating node FN1 and a second floating node FN2 electrically connected to each other. The first floating node FN1 presents a voltage level of the first floating electrode FE1, and the second floating node FN2 presents a voltage level of the second floating electrode FE2.

In the display apparatus 3000, a capacitance of a combined capacitor formed by the user capacitors $C_{H1}$, $C_{H2}$, and $C_{H3}$ may represent a touch on the insulating layer 11 of the display apparatus 3000. The display apparatus 3000 may sense the capacitance of the combined capacitor to determine that insulating substrate 11 of the display apparatus 3000 has been touched and to determine coordinates of the touch position.

According to embodiments of the invention, e.g., embodiments with the second floating electrode FE2, the capacitance that indicates a touch may be substantially large and easily detectable, such that the touch sensing sensitivity of a display apparatus may be substantially desirable.

While the invention has been described with reference to example embodiments, it will be apparent to those skilled in the art that various changes and modifications may be made without departing from the spirit and scope of the invention. It should be understood that the above embodiments are not limiting, but illustrative. Thus, the scope of the invention is to be determined by the broadest permissible interpretation of the following claims and their equivalents, and shall not be restricted or limited by the foregoing description.

What is claimed is:

1. A display apparatus comprising:
   a first substrate;
   a second substrate overlapping the first substrate;
   an image display part disposed between the first substrate and the second substrate;
   a black matrix disposed on the second substrate;
   a primary first-type floating electrode overlapping a first portion of the black matrix and being electrically floating;
   a plurality of first-type touch lines being electrically insulated from each other, the first-type touch lines including a primary first-type touch line, the primary first-type touch line overlapping the primary first-type floating electrode and being electrically insulated from the primary first-type floating electrode; and
   a plurality of second-type touch lines being electrically insulated from each other, the second-type touch lines including a primary second-type touch line, the primary second-type touch line overlapping the primary first-type floating electrode and being electrically insulated from the primary first-type floating electrode.

2. The display apparatus of claim 1, wherein the first-type touch lines extend in a first direction and arranged along a second direction, wherein the second-type touch lines extend in the second direction and arranged along the first direction.

3. The display apparatus of claim 2, wherein the primary first-type touch line includes a primary first-type touch electrode and a secondary first-type touch electrode that are electrically connected to each other in the first direction, and wherein the primary first-type touch electrode has a mesh structure and has a substantially rhombus shape.

4. The display apparatus of claim 3, wherein the primary first-type touch electrode overlaps four first-type floating electrodes that include the primary first-type floating electrode.

5. The display apparatus of claim 2, further comprising: a crossing insulating layer disposed between the primary first-type touch line and the primary second-type touch line at a position where the primary first-type touch line overlaps the primary second-type touch line.

6. The display apparatus of claim 2, wherein if a touch event is occurred at second substrate, then a first user capacitor, a second user capacitor, and a third user capacitor are formed, the first user capacitor being formed between the primary first-type touch line and the user, a second user capacitor being formed between the primary second-type touch line and the user, and the third user capacitor being formed between the primary first-type floating electrode and the user.

7. The display apparatus of claim 2, further comprising:
   a planarization layer disposed between the black matrix and the primary first-type floating electrode;
   a first insulating layer disposed between the primary first-type floating electrode and the primary first-type touch line and disposed between the primary first-type floating electrode and the primary second-type touch line; and
   a second insulating layer disposed between the image display part and the primary first-type touch line and disposed between the image display part and the primary second-type touch line.

8. The display apparatus of claim 7, further comprising: a primary second-type floating electrode overlapping each of the primary first-type touch line and primary second-type touch line, being electrically insulated from each of the primary first-type touch line and primary second-type touch line by the second insulating layer, overlapping the first portion of the black matrix, and being electrically floating.

9. The display apparatus of claim 8, wherein the primary second-type floating electrode has a same shape as the primary first-type floating electrode in a plan view of the display apparatus.

10. The display apparatus of claim 8, further comprising: a secondary second-type floating electrode overlapping a second portion of the black matrix, being electrically floating, and being disposed at a same layer as the primary second-type floating electrode, wherein the plurality of first-type touch lines includes a secondary first-type touch line, and wherein the secondary second-type floating electrode overlaps the secondary first-type touch line without overlapping any second-type touch lines in a third direction that is perpendicular to each of the first direction and the second direction.

11. The display apparatus of claim 10, further comprising: a secondary first-type floating electrode overlapping the secondary second-type floating electrode, being disposed on the planarization layer at a same layer as the primary first-type floating electrode, and being electrically floating, wherein the secondary first-type floating electrode overlaps the secondary first-type touch line without overlapping any second-type touch lines in the third direction, and wherein the secondary first-type touch line is disposed between the secondary first-type floating electrode and the secondary second-type floating electrode.

12. The display apparatus of claim 11, further comprising: a first feeding electrode electrically connected to each of the secondary first-type floating electrode and the secondary second-type floating electrode, the first feeding electrode being disposed through each of the first insulating layer and the second insulating layer.

13. The display apparatus of claim 12, further comprising: a second feeding electrode electrically connected to each of the primary first-type floating electrode and the primary second-type floating electrode, the second feeding electrode being disposed through each of the first insulating layer and the second insulating layer.

14. The display apparatus of claim 12, wherein the first feeding electrode overlaps the second portion of the black matrix.

15. The display apparatus of claim 8, further comprising: a feeding electrode electrically connected to each of the primary first-type floating electrode and the primary second-type floating electrode, the feeding electrode being disposed through each of the first insulating layer and the second insulating layer.

16. The display apparatus of claim 15, further comprising: a via-hole disposed through each of the first insulating layer and the second insulating layer, wherein the feeding electrode is disposed in the via-hole.

17. The display apparatus of claim 15, wherein the feeding electrode overlaps the first portion of the black matrix.

18. The display apparatus of claim 2, further comprising: a secondary first-type floating electrode overlapping a second portion of the black matrix, being electrically floating, and being disposed at a same layer as the primary first-type floating electrode, wherein the plurality of first-type touch lines includes a secondary first-type touch line, and wherein the secondary first-type floating electrode overlaps the secondary first-type touch line without overlapping any second-type touch lines in a third direction that is perpendicular to each of the first direction and the second direction.

19. The display apparatus of claim 18, wherein the primary first-type touch line is narrower than the secondary first-type touch line in the first direction.

20. The display apparatus of claim 18, wherein the primary second-type touch line is narrower than the secondary first-type touch line in the first direction.

* * * * *